Dec. 12, 1933.  R. C. TERRY  1,939,190
ANIMAL TRAP
Filed April 14, 1932
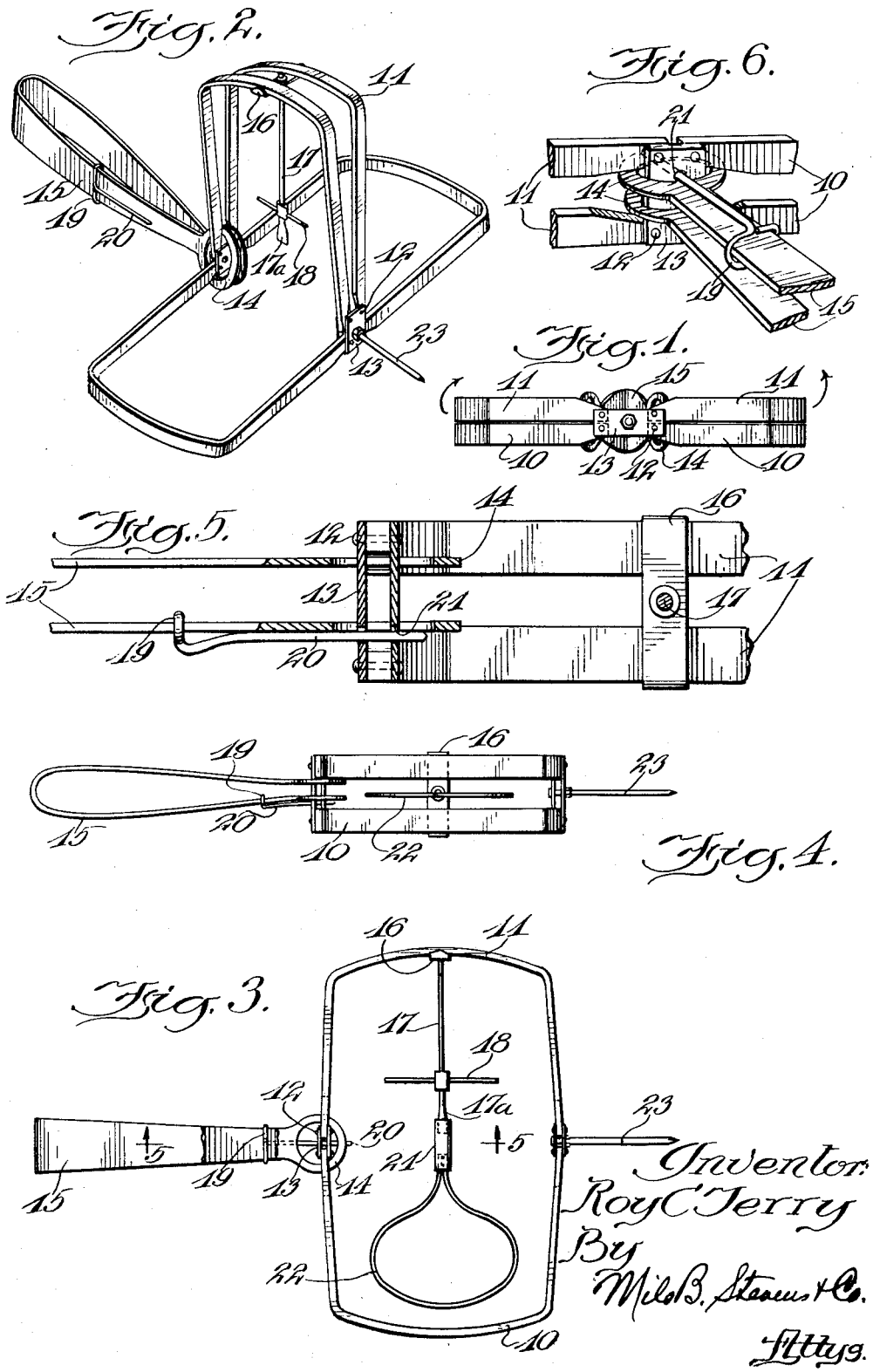

Patented Dec. 12, 1933

1,939,190

UNITED STATES PATENT OFFICE 1,939,190

ANIMAL TRAP

Roy C. Terry, Chicago, Ill., assignor of one-fifth to Milo B. Stevens & Co., Chicago, Ill.

Application April 14, 1932. Serial No. 605,242

9 Claims. (Cl. 43—88)

My invention relates to animal traps of the outdoor type, and has for its main object to provide a trap which is of a versatile character, whereby to serve for animals of different sizes and locations of different character.

A further object of the invention is to construct the trap along simple and rugged lines.

Other objects will be evident in the course of the following description in connection with the accompanying drawing, in which—

Fig. 1 is an end view of the novel trap when it is not in use;

Fig. 2 is a perspective view, showing the trap set for small animals or where room is limited;

Fig. 3 is a plan view of the trap set for larger animals in the fashion of an ordinary steel trap;

Fig. 4 is a front elevation of Fig. 3;

Fig. 5 is an enlarged section on the line 5—5 of Fig. 3; and

Fig. 6 is an enlarged inverted view of a locking device illustrated in Figs. 3 to 5.

Referring specifically to the drawing, 10 denotes one set of arch-like jaws, and 11 a companion set thereof, entering into the construction of the trap. The bases of the jaws are assembled at a medial point to make pivotal connections 12 with pairs of center plates 13, so that each of the jaws will be swingable about the pivot pins at its base. At one side the assembly of jaws receives the looped ends 14 of an arched spring 15, such spring being conventional in the trap art.

Fig. 1 shows the jaws 11 closed upon the respective jaws 10, and the arms of the spring 15 distended and without tension. For the purpose of trapping small animals, or where the trap is to be set under ground or in a hidden place, I set only the upper jaws 11. Thus, these are swung in the direction of the arrows in Fig. 1 to assume the position indicated in Fig. 2. Here a clip 16 is applied to the corners of the jaws to keep them together, the clip being extended downwardly with a trigger 17 having a suitable perch 18 for bait. Naturally, the setting of the jaws 11 as just described compresses the spring 15 as indicated in Fig. 2; and when the animal by its entry or passage loosens the trigger 17, both of the jaws 11 fly out to close upon the respective jaws 10 and kill the animal on the advance or retreat.

Figs. 3 to 6 show the trap set in the manner of the conventional steel trap. For this purpose, not only the jaws 11 are swung together, as per Fig. 2, but the jaws 10 are also swung toward and to close upon each other. The condition thus brought about is illustrated in Fig. 6, indicating that both sets of jaws contribute to the compression of the spring 15, and that the latter is therefore exerting its force on both sets. When the trap is set on the ground in horizontal position, as indicated by Fig. 3, it is not necessary for the lower jaws to be under tension, as they have only to rest upon the ground to form a base for the trap. They are therefore relieved from the pressure of the spring by a lock illustrated clearly in Figs. 2, 5 and 6. Here it will be seen that one of the spring arms 15 carries a looped slide 19 from which is projected a pin 20. This pin occurs on the bottom side of the trap when viewed as per Figs. 3 to 5, and those portions of the center plates 13 which correspond to this position are perforated as indicated at 21 to permit the pin 20 to be slid therethrough as clearly indicated in Figs. 5 and 6. This action practically relieves the lower trap jaws 10, 11 from the pressure of the adjacent spring arm 15, so that the tension of the spring becomes entirely effective through its other arm.

The trigger 17 and its accessory parts is duplicated in the present setting of the trap, as clearly shown in Fig. 3; however, the trigger has a terminal stem 17a upon which is fastened the tubular base 21 of a wire loop or enlargement 22 which augments the trigger as an obstacle for the animal to strike. When the trigger is dislodged, the top jaws 10, 11 fly upward toward each other, trapping the animal between them.

The trap can also be used in a third fashion when Fig. 3 is considered an elevation thereof instead of a plan view, and this elevation is swung 90 degrees in a clockwise direction. The present bottom of the trap carries a spike 23 which may be stuck into the ground to support the trap in erect form. In this instance, it is not necessary to advance the pin 20 for locking purposes, so that the spring 15 therefore exerts its tension upon both sets of jaws, while the clip 16 of the trigger keeps the trap open or set by simply engaging one pair of jaws as indicated in Fig. 3, since these do not permit the spring to expand relative to the other pair of jaws. Thus, the dislodgment of the trigger relieves the jaws in pairs, these closing from both ends of the trap as set in the rotated position mentioned.

It will be seen that I have provided a trap which, though of comparatively few parts, is capable of being applied or used in three ways, as the size of the animal or the particular location may require. The trap has no complicated or delicate parts to get out of order, and is of a construction to be easily manipulated by persons familiar with articles of this kind.

I claim:—

1. An animal trap comprising a pair of opposed center plates, a lower pair of arches pivotally connected to said center plates oppositely directed from the plates and pivotally connected thereto, a similarly disposed upper pair of arches, a compression spring in the region of one center plate, each pair of arches being inwardly swingable to become closely grouped and compress the spring, and a trigger applicable to one group of arches to maintain the spring in compressed state, the pairs of arches returning to original positions by force of the spring when the trigger is dislodged.

2. The structure of claim 1, and means to lock the spring from exerting such force against one pair of arches adjacent thereto.

3. The structure of claim 1, the spring being a U-type and the corresponding center plate being perforated outwardly of one spring arm, and a pin slidable into the perforation after the spring has been compressed to lock said arm from returning and exerting force against one pair of arches adjacent thereto.

4. The structure of claim 1, the spring being a U-type and the corresponding center plate being perforated outwardly of one spring arm, a pin slidable into the perforation after the spring has been compressed to lock said arm from returning and exerting force against one pair of arches adjacent thereto, and a connection to retain the pin on said arm.

5. The structure of claim 1, the spring being a U-type and the corresponding center plate being perforated outwardly of one spring arm, a pin slidable into the perforation after the spring has been compressed to lock said arm from returning and exerting force against one pair of arches adjacent thereto, and a shank for the pin looped around said arm to retain the pin thereon.

6. An animal trap comprising a base formed by a pair of opposed arches with their feet hingedly joined to connecting means, a second pair of arches spanning the first pair and also hingedly joined with their feet to said connecting means, a spring held in compressed state by the second pair of arches, and a trigger holding the latter in grouped relation, the dislodgment of the trigger releasing the second pair of arches to swing out upon the first pair by force of the spring.

7. An animal trap consisting of a base comprising a pair of pivotally connected clamping jaws, a second pair of clamping jaws spanning said first-mentioned jaws and pivotally connected to the base, a spring between said pairs of jaws, and a tripping mechanism for holding the spring in compressed state, the jaws swinging outwardly by force of the spring when said tripping mechanism is actuated.

8. The structure of claim 7, and means to lock the spring from exerting such force against one pair of jaws adjacent thereto.

9. An animal trap comprising a base formed by a pair of opposed arches with their feet hingedly joined to connecting means, a pair of arches above the base and also hingedly joined with their feet to said connecting means, a spring between the pairs of arches, and means holding an arch of the base and a correspondingly-located upper arch in grouped relation and to compress the spring, the latter forcing the arches to swing outwardly when the holding means is released.

ROY C. TERRY.